(12) United States Patent
Giroux et al.

(10) Patent No.: US 11,834,153 B2
(45) Date of Patent: Dec. 5, 2023

(54) SYSTEM AND METHOD FOR DISTRIBUTED PILOT CONTROL OF AN AIRCRAFT

(71) Applicant: BETA AIR, LLC, South Burlington, VT (US)

(72) Inventors: Andrew Giroux, Georgia, VT (US); Timothy Gerard Richter, Wynantskill, NY (US); Nicholas Moy, Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 295 days.

(21) Appl. No.: 17/349,453

(22) Filed: Jun. 16, 2021

(65) Prior Publication Data

US 2022/0371724 A1     Nov. 24, 2022

Related U.S. Application Data

(63) Continuation-in-part of application No. 17/323,637, filed on May 18, 2021, now Pat. No. 11,281,237.

(51) Int. Cl.
*B64C 19/02*     (2006.01)
*B64C 13/04*     (2006.01)

(52) U.S. Cl.
CPC .............. *B64C 19/02* (2013.01); *B64C 13/04* (2013.01)

(58) Field of Classification Search
CPC ................................ B64C 19/02; B64C 13/04
See application file for complete search history.

(56) References Cited

U.S. PATENT DOCUMENTS

| | | | |
|---|---|---|---|
| 5,478,031 A | 12/1995 | Piche | |
| 6,301,534 B1 | 10/2001 | McDermott, Jr. | |
| 7,039,473 B2 | 5/2006 | Corban | |
| 7,499,776 B2 | 3/2009 | Allard | |
| 9,428,184 B2 | 8/2016 | Kikuchi | |
| 9,464,410 B2 | 10/2016 | Johnson | |
| 10,543,853 B2 | 1/2020 | Toyoda | |
| 2012/0101663 A1* | 4/2012 | Fervel | B64C 13/505 |
| | | | 701/3 |

(Continued)

OTHER PUBLICATIONS

Title: An Initial Study of Pilot-Adaptive Controller Interactions in Flight Control by: Boskovic Date: Aug. 2020 Type: PDF, Research Article.

(Continued)

*Primary Examiner* — Aaron L Troost
(74) *Attorney, Agent, or Firm* — CALDWELL INTELLECTUAL PROPERTY LAW

(57) ABSTRACT

A system for a distributed pilot control of an aircraft is disclosed. The system includes a plurality of flight components. The system also includes an aircraft control located within the aircraft. The system includes an aircraft component attached to a flight component of the plurality of flight components. The aircraft component is configured to receive, from a command sensor attached to the aircraft control, an aircraft command. The aircraft component is configured to obtain, from an attitude sensor, an aircraft orientation. The aircraft component is configured to receive, as a function of a notification unit, a pilot signal. The aircraft component is additionally configured to command the flight component to produce a response command as a function of the pilot signal.

18 Claims, 10 Drawing Sheets

(56) References Cited

U.S. PATENT DOCUMENTS

| | | | |
|---|---|---|---|
| 2016/0072425 A1* | 3/2016 | Neely | H02P 5/00 |
| | | | 318/461 |
| 2017/0275011 A1* | 9/2017 | Luszcz | B64D 35/00 |
| 2018/0239366 A1* | 8/2018 | Cutler | B64U 50/19 |
| 2019/0100299 A1* | 4/2019 | Babazadeh | B64C 13/50 |
| 2019/0359323 A1* | 11/2019 | Cadotte | B64C 13/503 |
| 2020/0247426 A1 | 8/2020 | Rafferty | |

OTHER PUBLICATIONS

Title: Car position and orientation based driving skill metric for analytical driving skill index evaluator Date: May 30, 2016 by: Hisham Type: PDF, Article.

* cited by examiner

SYSTEM AND METHOD FOR DISTRIBUTED PILOT CONTROL OF AN AIRCRAFT

CROSS-REFERENCE TO RELATED APPLICATIONS

This application is a continuation-in-part of U.S. patent application Ser. No. 17/323,637, filed on May 18, 2021, and titled, "SYSTEM AND METHOD FOR DISTRIBUTED CONTROL OF AN AIRCRAFT," which is incorporated by reference herein in its entirety.

FIELD OF THE INVENTION

The present invention generally relates to the field of control systems for aircrafts. In particular, the present invention is directed to a system and method for distributed pilot control of an aircraft.

BACKGROUND

Modern aircraft use fly-by-wire (FBW) systems (fully electronic control) to control engines, actuators and other loads necessary for flight. These systems are generally flight critical and cannot fail catastrophically if a single point of failure or common mode failure occurs. FBW relies on processing algorithms and communication between devices to operate properly. Flight control computers are centralized resources that are subject to common mode failures. In conventional aircrafts, the flight control computer is responsible for processing sensor inputs, generating commands for aerodynamic flight control actuators and engine thrust. Flight control computers often also provide envelope protection that limits actuator commands based on aircraft attitude and rates.

SUMMARY OF THE DISCLOSURE

In an aspect, a system for distributed pilot control of an aircraft includes a plurality of flight components, an aircraft control located within the aircraft, and an aircraft component attached to a flight component of the plurality of flight components, wherein the aircraft component is configured to receive, from a command sensor attached to the aircraft control, an aircraft command, obtain, from an attitude sensor, an aircraft orientation, receive, as a function of a notification unit, a pilot signal, and command the flight component to produce a response command as a function of the pilot signal.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to a system for distributed pilot control of an aircraft. In an embodiment, this disclosure can include an aircraft control located within the aircraft. Aspects of the present disclosure can also include a plurality of flight components. Aspects of the present disclosure can be used for commanding the plurality of flight components to produce a response command using an aircraft component. Exemplary embodiments illustrating aspects of the present disclosure are described below in the context of several specific examples.

Figure 1:
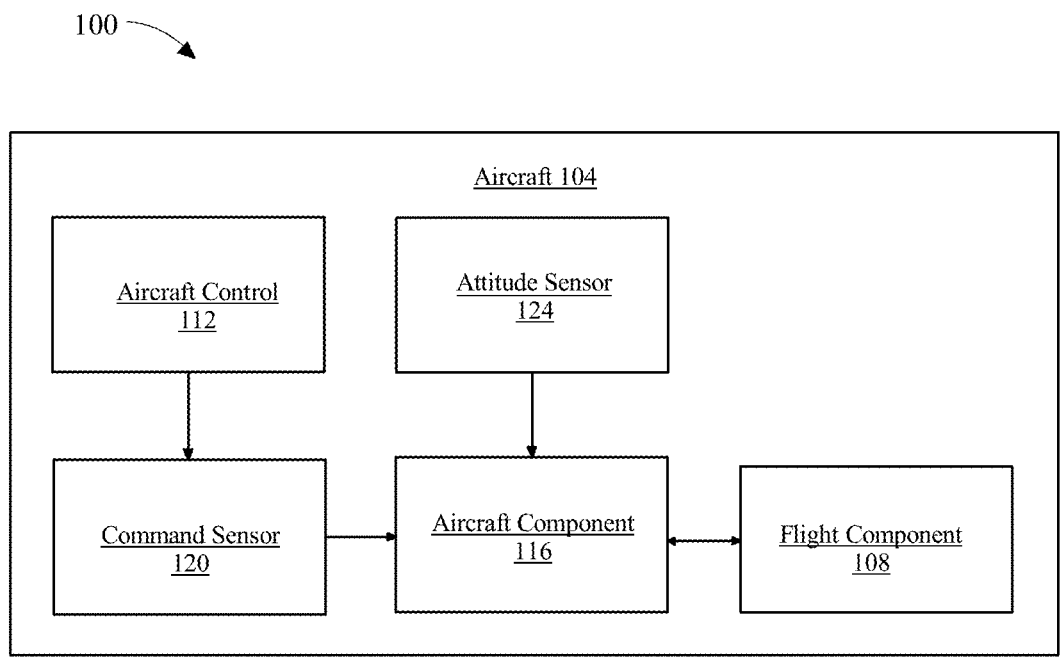
FIG. 1 is a block diagram of an exemplary embodiment of a system for distributed flight control.

Referring now to FIG. 1, an exemplary embodiment of a system 100 for distributed control of an aircraft 104 is illustrated. As used in this disclosure an "aircraft" vehicle that may fly by gaining support from the air. As a non-limiting example, aircraft may include airplanes, helicopters, airships, blimps, gliders, paramotors, and the like thereof. Aircraft 104 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

Continuing to refer to FIG. 1, an illustration of forces is illustrated in an electric aircraft. During flight, a number of forces may act upon the electric aircraft. Forces acting on an aircraft during flight may include thrust, the forward force produced by the rotating element of the aircraft and acts parallel to the longitudinal axis. Drag may be defined as a rearward retarding force which is caused by disruption of airflow by any protruding surface of the aircraft such as, without limitation, the wing, rotor, and fuselage. Drag may oppose thrust and acts rearward parallel to the relative wind. Another force acting on aircraft may include weight, which may include a combined load of the aircraft itself, crew, baggage and fuel. Weight may pull aircraft downward due to the force of gravity. An additional force acting on aircraft may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

Still referring to FIG. 1, system 100 includes a plurality of flight components 108. As used in this disclosure a "flight component" is a component that promotes flight and guidance of an aircraft. In an embodiment, flight component 108 may be mechanically coupled and/or attached to aircraft 104. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly by gaining support from the air. Furthermore, in an embodiment, mechanical coupling may be used to join two pieces of rotating electric aircraft components.

With continued reference to FIG. 1, the plurality of flight components 108 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of flight components 108 may include a component used to produce a torque that affects the aircrafts' roll and pitch which may comprise one or more ailerons, defined herein as hinged surfaces which form part of the trailing edge of each wing in a fixed wing aircraft, and which may be moved via mechanical means such as without limitation servomotors, mechanical linkages, or the like, to name a few. As a further example, the plurality of flight components 108 may include a rudder, which may include, without limitation, a segmented rudder that produces a torque about a vertical axis. Additionally or alternatively, the plurality of flight components 108 may include other flight control surfaces such as propulsors, rotating flight controls, or any other structural features which can adjust the movement of the aircraft, wherein propulsors may include one or more puller components and/or pusher components as described below in detail, in reference to FIG. 2. Plurality of flight components 108 may include one or more rotors, turbines, ducted fans, paddle wheels, and/or other components configured to propel a vehicle through a fluid medium including, but not limited to air.

In another embodiment, and still referring to FIG. 1, propulsor may include a propeller, a blade, or any combination of the two. The function of a propeller is to convert rotary motion from an engine or other power source into a swirling slipstream which pushes the propeller forwards or backwards. Propulsor may include a rotating power-driven hub, to which are attached several radial airfoil-section blades such that the whole assembly rotates about a longitudinal axis. As a non-limiting example, the blade pitch of the propellers may be fixed at a fixed angle, manually variable to a few set positions, automatically variable (e.g. a "constant-speed" type), and/or any combination thereof as described further above. As used in this disclosure a "fixed angle" is an angle that is secured and/or unmovable from the attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft are designed to be fixed to their hub at an angle similar to the thread on a screw makes an angle to the shaft; this angle may be referred to as a pitch or pitch angle which will determine the speed of the forward movement as the blade rotates. Additionally or alternatively, propulsor component may be configured at a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 1, propulsor may include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 1, plurality of flight components 108 may include power sources, control links to one or more elements, fuses, and/or mechanical couplings used to drive and/or control any other flight component. Plurality of flight components 108 may include a motor that operates to move one or more flight control components, to drive one or more propulsors, or the like. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking.

Still referring to FIG. 1, plurality of flight components 108 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system 100 may be incorporated.

In an embodiment, and still referring to FIG. 1, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO$_4$) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO$_4$), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 1, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source.

Still referring to FIG. 1, an aircraft control 112 is located within system 100. As used in this disclosure an "aircraft control" is a control and/or guidance system that maneuvers the aircraft. In an embodiment, aircraft control 112 may include a mechanical and/or manually operated flight control system. For example, and without limitation aircraft control 112 may include a collective control. As used in this disclosure a "collective control" is a mechanical control of an aircraft that allows a pilot and/or other operator to adjust and/or control the pitch angle of aircraft 104. For example and without limitation, collective control may alter and/or adjust a pitch angle of all the main rotor blades collectively. For example, and without limitation aircraft control 112 may include a yoke control. As used in this disclosure a "yoke control" is a mechanical control of an aircraft to control the pitch and/or roll. For example and without limitation, yoke control may alter and/or adjust the roll angle of aircraft 104 as a function of controlling and/or maneuvering ailerons. In an embodiment, aircraft control 112 may include one or more foot brakes, control sticks, pedals, throttle levels, and the like thereof. Additionally or alternatively, aircraft control 112 may be configured to translate a desired command. As used in this disclosure a "desired command" is a direction and/or command that a pilot desires, wishes, and/or wants for a flight component. In an embodiment, and without limitation, desired command may include a desired torque for flight component 108. For example, and without limitation, aircraft control 112 may translate that a desired torque for a propeller be 160 lb. ft. of torque. As a further non-limiting example, aircraft control 112 may translate that a pilot's desired torque for a propulsor be 290 lb. ft. of torque. In another embodiment, aircraft control 112 may include a digital and/or automated flight control system. For example, and without limitation, aircraft control 112 may include a computing device and/or flight controller capable of producing an autonomous function, wherein an autonomous function is described below in detail, in reference to FIG. 4. In an embodiment, aircraft control 112 may include storing a flight plan and/or flight path. For example, and without limitation, aircraft control 112 may store a flight plan in a localized memory and/or memory cache of a first aircraft component, wherein a plurality of segments of the flight plan may be stored in a plurality of aircraft components of aircraft 104, wherein an aircraft component is described below in detail.

Still referring to FIG. 1, system 100 includes an aircraft component 116 attached to flight component 108 of the plurality of flight components. As used in this disclosure an "aircraft component" is one or more logic circuits capable of performing one or more computerized functions. In an embodiment, and without limitation, aircraft component may include one or more application-specific integrated circuits (ASICs), field-programmable gate arrays (FPGAs), multiplexors, registers, arithmetic logic units (ALUs), computer memory caches, microprocessors, computing devices, and the like thereof. In an embodiment, system 100 may include a plurality of aircraft components 108. Aircraft component 116 may include any computing device as described in this disclosure, including without limitation a microcontroller, digital signal processor (DSP) and/or system on a chip (SoC) as described in this disclosure. Computing device may include, be included in, and/or communicate with a mobile device such as a mobile telephone or smartphone. Aircraft component 116 may include a single computing device operating independently, or may include two or more computing device operating in concert, in parallel, sequentially or the like; two or more computing devices may be included together in a single computing device or in two or more computing devices. Aircraft component 116 may interface or communicate with one or more additional devices as described below in further detail via a network interface device. Network interface device may be utilized for connecting aircraft component 116 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Aircraft component 116 may include but is not limited to, for example, a computing device or cluster of computing devices in a first location and a second computing device or cluster of computing devices in a second location. Aircraft component 116 may include one or more computing devices dedicated to data storage, security, distribution of traffic for load balancing, and the like. Aircraft component 116 may distribute one or more computing tasks as described below across a plurality of computing devices of computing device, which may operate in parallel, in series, redundantly, or in any other manner used for distribution of tasks or memory between computing devices. Aircraft component 116 may be implemented using a "shared nothing" architecture in which data is cached at the worker, in an embodiment, this may enable scalability of system 100 and/or computing device.

With continued reference to FIG. 1, aircraft component 116 may be designed and/or configured to perform any method, method step, or sequence of method steps in any embodiment described in this disclosure, in any order and with any degree of repetition. For instance, aircraft component 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Aircraft component 116 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, aircraft component 116 is configured to receive an aircraft command. As used in this disclosure an "aircraft command" is a command directing a flight component to perform an action and/or motion. In an embodiment, and without limitation, aircraft command may include a command to increase and/or enhance a thrust force generated by a propulsor to provide lift to aircraft 104. For example, and without limitation, aircraft command may instruct a propeller to increase a first revolutions per minute of 2,000 to a second revolutions per minute of 4,000. In an embodiment, and without limitation, aircraft command may include a command to alter and/or shift about an axis. For example, and without limitation, aircraft command may include a command to rotate a rudder 3° about a vertical axis. In another embodiment, and without limitation, aircraft command may include a command to reduce and/or reverse a first torque magnitude and/or direction. As a non-limiting example, aircraft command may command a propeller that has a first torque of 12 Nm to reduce the torque to 2 Nm. In an embodiment, and without limitation, aircraft command 116 may include one or more commands to direct a flight component to alter a heading, speed, altitude, departure angle, approach angle, route paths, and the like thereof.

Still referring to FIG. 1, aircraft component 116 is configured to receive aircraft command from a command sensor 120 attached to aircraft control 112. As used in this disclosure a "command sensor" is a device, module, and/or subsystem, utilizing any hardware, software, and/or any combination thereof to detect events and/or changes to aircraft 104 as a function aircraft control 112. For example, and without limitation, command sensor may detect events as a function of one or more modifications of aircraft control 112, modifications compared to a flight plan, and the like thereof. For example, and without limitation, command sensor 120 may be configured to detect one or more changes in torque, force, thrust, pitch angle, angle of attack, velocity, momentum, altitude, roll, yaw, and the like thereof. In an embodiment, and without limitation, command sensor 120 may be attached via a mechanically and/or communicatively coupled, as described above, to aircraft 104. Additionally or alternatively, command sensor 120 may be configured to detect aircraft command, wherein aircraft command includes a desired output of flight component 108 of the plurality of flight components. As used in this disclosure a "desired output" is an output and/or function that is wanted and/or expected to be performed by flight component 108. For example, and without limitation, desired output may denote that a propeller blade should maintain a rotational velocity of 330 rad/s. As a further non-limiting example, desired output may denote that aircraft 104 should have a pitch angle of 3.7°. As a further non-limiting example, desired output may denote that aircraft 104 should maintain a forward thrust of 800 N. In an embodiment, and without limitation, command sensor 120 may transmit the aircraft command to aircraft component 116. For example, command sensor 120 may transmit aircraft command to aircraft component 116 as a function of one or more communication signals and/or signal codes as described below in detail. As a further non-limiting example, command sensor 120 may transmit aircraft command by converting the aircraft command to a digital electrical signal. As used in this disclosure a "digital electrical signal" is a coded electrical impulse to convey information. As a non-limiting example, digital electrical signal may include a bit that specific a basic unit of information that may be represented using terms and/or symbols such as 1, 0, yes, no, true, false, +, −, on, and/or off. In an embodiment, and without limitation, digital electrical signal may include one or more signal codes, wherein a signal code is described in detail below, in reference to FIG. 3.

In another embodiment, and still referring to FIG. 1, command sensor 120 may be configured to detect one or more statuses of aircraft 104 as a function of aircraft control 112. For example and without limitation, a status of aircraft 104 may include datum representing one or more conditions of the energy source and/or motor. One or more conditions may include, without limitation, voltage levels, electromotive force, current levels, temperature, current speed of rotation, and the like. Command sensor 120 may further include detecting electrical parameters. Electrical parameters may include, without limitation, voltage, current, ohmic resistance of a flight component. Command sensor 120 may include one or more environmental sensors, which may function to sense parameters of the environment surrounding the aircraft. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, command sensor 120 may include at least a geospatial sensor. Command sensor 120 may be located inside an aircraft; and/or be included in and/or attached to at least a portion of the aircraft. Command sensor 120 may include one or more proximity sensors, displacement sensors, vibration sensors, and the like thereof. Command sensor 120 may be comprised of one or more gyroscopes, accelerometers, magnetometers, inertial measurement units, pressure sensors. Command sensor 120 may be used to monitor the status of aircraft 104 for both critical and non-critical functions. Command sensor 120 may be incorporated into vehicle or aircraft or be remote.

Still referring to FIG. 1, aircraft component 116 is configured to obtain, from an attitude sensor 124, an aircraft orientation. As used in this disclosure an "attitude sensor" is a device, module, and/or subsystem, utilizing any hardware, software, and/or any combination thereof to detect an attitude and/or orientation of aircraft 104. For example, and without limitation, attitude n sensor 124 may include one or more sensors similar to command sensor 120. In an embodiment, and without limitation, attitude sensor 124 may include a proximity sensor, pressure sensor, light sensor, pitot tubes, air speed sensor, and the like thereof. For example, attitude sensor 124 may include a motion sensor configured to detect motion in three or more dimensions and/or orientation in three dimensions of aircraft 104. For example, and without limitation, a motion sensor may include a MEMS sensor, inertial measurement unit (IMU), an accelerometer, wherein one or more accelerometers may include a plurality of accelerometers, such as three or more accelerometers positioned to span three dimensions of possible acceleration, so that any direction and magnitude of acceleration in three dimensions may be detected and measured in three dimensions, and the like thereof. Attitude sensor 124 may include one or more gyroscopes; one or more gyroscopes may include a plurality of gyroscopes, such as three or more gyroscopes positioned to span three dimensions of possible acceleration, so that any direction and magnitude of change in angular position in three dimensions may be detected and measured in three dimensions. Attitude sensor 124 may include one or more magnetic sensors or magnetometers such as Hall effect sensors, compasses such as solid-state compasses, or the like; one or more magnetometers may include a plurality of magnetometers, such as three or more magnetometers positioned to span three dimensions of possible orientation, so that any direction and magnitude of change in magnetic field in three dimensions may be detected and measured in three dimensions, possibly for measurement of the aircraft's orientation to the Earth's true North or detection of magnetic anomalies.

In an embodiment, and without limitation, attitude sensor 124 may include one or more navigation facility receivers. As used in this disclosure a "navigation facility receiver" is sensor and/or receiver that may locate and/or identify a location of an aircraft with respect to a geolocation. For example and without limitation, navigation facility receiver may include a global positioning system (GPS) receiver. As a further non-limiting example, navigation facility receiver may include a global navigation satellite system (GLONASS) receiver. As a further non-limiting example, navigation facility receiver may include a BeiDou receiver. As a further non-limiting example, navigation facility receiver may include a Galileo receiver. As a further non-limiting example, navigation facility may include a NAVIC receiver.

In an embodiment, navigation facility receiver may include one or more satellite constellation receivers and/or similar emitting systems that can calculate a location based on the time and/or phase difference of the receiver signals. In an embodiment, and without limitation, navigation facility receiver may include a receiving antenna, accompanying circuits, and processing. One or more navigation facility receivers may be configured to determine the orientation of the aircraft in relation to the Earth's true North, using differential GPS, phase differences, and/or other methods to exploit the satellite constellations and their positions. One or more facility navigation receivers may be configured to receive and determine the local time based on the time information received from the satellite signals. One or more navigation facility receivers may receive position and timing signals, and the like and convert such detected signals into electrical signals, which may be processed further by aircraft component 116.

In an embodiment, and still referring to FIG. 1, attitude sensor 124 may detect a topographical datum. As used in this disclosure a "topographical datum" is an element of datum representing the arrangement and/or location of a physical feature of a geolocation. For example, and without limitation, topographical datum may include one or more elements of datum denoting a mountain range, skyscraper, river, ridge, ocean, lake, vehicle, animal, person, street, field, tree, and the like thereof. In an embodiment, and without limitation, attitude sensor 124 may include a light radar component. As used in this disclosure a "light radar component" is an active imaging source that transmits light toward an object or field of interest and detects back-scattered or reflected light, measuring time of flight (ToF), interferometry, and/or phase of such back-scattered and/or reflected light to compute distances to, velocities, and/or accelerations of objects at points from which back-scatter and/or reflection occurred. In an embodiment, the wavelength of light may be outside the range of visible light; for instance, and without limitation, wavelength may be in the infrared range as described above. Light radar component may include a "flash lidar" component, mechanical or non-mechanical beam steering, light patterns, and/or computational imaging methods, such as plenoptic or other multi-aperture embodiments. In an embodiment, and without limitation, light radar component may include one or more optical elements for focusing, collimating, and/or transmitting light emitted by light source. In an embodiment, intensity and/or focus may default to minimally harmful settings, permitting allowing ToF ranging or the like to determine a distance to a nearest topographical data point and/or ground point. Light radar component may include detectors that may be sensitive specifically to a narrow band of wavelengths transmitted by light source, and/or may be sensitive to a range of wavelengths that includes the band transmitted by the light source. Detectors may be designed to react quickly to initial detection of photons, for instance through use of APDs or other highly sensitive detectors. Still referring to FIG. 1, an "aircraft orientation," as used herein, is an aircraft attitude about a three-axis system. As used in this disclosure a "three-axis system" is region of space represented by three dimensions that share a similar origin. For example, and without limitation, three-axis system may include a more yaw, pitch, and/or roll axis. As used in this disclosure a "yaw axis" is an axis that is directed towards the bottom of the aircraft, perpendicular to the wings. For example, and without limitation, a positive yawing motion may include adjusting and/or shifting the nose of aircraft 104 to the right about the vertical axis. As used in this disclosure a "pitch axis" is an axis that is directed towards the right laterally extending wing of the aircraft. For example, and without limitation, a positive pitching motion may include adjusting and/or shifting the nose of aircraft 104 upwards about the horizontal axis. As used in this disclosure a "roll axis" is an axis that is directed longitudinally towards the nose of the aircraft, parallel to the fuselage. For example, and without limitation, a positive rolling motion may include lifting the left and lowering the right wing concurrently about the longitudinal axis. Additionally or alternatively, attitude sensor 124 may detect aircraft orientation and transmit aircraft orientation to aircraft component 116. For example, attitude sensor 124 may transmit aircraft orientation to aircraft component 116 as a function of one or more communication signals and/or signal codes as described below in detail. As a further non-limiting example, attitude sensor 124 may transmit aircraft orientation by converting the aircraft orientation to a digital electrical signal, wherein a digital electrical signal is a coded electrical impulse to convey information as described above, in detail. In an embodiment, and without limitation, digital electrical signal may include one or more signal codes, wherein a signal code is described in detail below, in reference to FIG. 3.

Still referring to FIG. 1, aircraft component 116 is configured to command flight component 108 of the plurality of flight components to produce a response command. As used in this disclosure a "response command" is a command directing a flight component to perform an action and/or motion as a function of the aircraft command and/or aircraft orientation. In an embodiment, and without limitation, response command may include an actuator command. As used in this disclosure an "actuator command" is a direction and/or instruction given to an actuator to move and/or shift a flight component. For example, and without limitation, actuator command may direct an actuator to may adjust a propulsor 4° in the horizontal axis. As a further non, limiting example, actuator command may direct an actuator to may adjust an aileron 2° in the vertical axis. As a further non-limiting example, actuator command may direct a flight component with a first vertical axis, wherein the first vertical axis may include a 2.2° inward and/or 2.7° forward, to maneuver and/or shift the flight component +/−15° in the horizontal and/or longitudinal axis. Additionally or alternatively, response command may include a thrust command. As used in this disclosure a "thrust command" is a direction and/or instruction given to a flight component that produces thrust. For example, and without limitation, thrust command may instruct a propulsor to reduce a first thrust of 8,000 N to a second thrust of 2,000 N. As a further non-limiting example, thrust command may instruct a propulsor to increase an airspeed from a first airspeed of 230 km/h to a second airspeed of 402 km/h.

Still referring to FIG. 1, response command may be produced as a function of determining at least an aircraft response. As used in this disclosure an "aircraft response" is one or more actions an aircraft may perform in response to a change. For example, and without limitation, aircraft response may include decreasing altitude, increasing altitude, reducing airspeed velocity, changing the heading direction, applying a braking force, and the like thereof. In an embodiment, and without limitation, aircraft response may be determined as a function of simulating an aircraft command adjustment. As used in this disclosure an "aircraft command adjustment" is a proposed change and/or modification to aircraft 104 that may elucidate a response. For example, and without limitation, aircraft command adjustment may include a proposed change to shift and/or alter a rudder. As a further non-limiting example, aircraft command adjustment may include a proposed change to increase rotational velocity of a rotor. In an embodiment, aircraft command adjustment may be simulated by detecting a failure event. As used in this disclosure a "failure event" is an element of data identifying a failure of a flight component of the plurality of flight components has occurred. In an embodiment and without limitation, failure event may include rotation degradation. As used in this disclosure "rotation degradation" is a reduced function of flight components such that a loss of control occurs in one of the axis in the three-axis system. As a non-limiting example, rotation degradation may occur due to a rotor in a quadrotor configuration that is not operating at the capacity necessary to maintain the flight plan, wherein the yaw portion of the torque exerted by the remaining rotors is not eliminated and an uncontrollable yaw axis force is exerted. In a further embodiment and without limitation, failure event may include a propulsor that is not generating enough torque to maintain the flight plan.

In an embodiment, and still referring to FIG. 1, aircraft command adjustment may be simulated as a function of a control algorithm. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, aircraft component may simulate one or more adjustments independent of the plurality of alternate aircraft components. In another embodiment, and without limitation, aircraft component may simulate one or more adjustments in conjunction with the simulation performed by the plurality of alternate aircraft components. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to receive a segmented control algorithm. As used in this disclosure a "segmented control algorithm" is control algorithm that has been separated and/or parsed into discrete sections. For example, and without limitation, segmented control algorithm may include a parsed control algorithm into two or more segments, wherein each segment of control algorithm may be performed by one or more aircraft components operating on distinct flight components.

In an embodiment, and still referring to FIG. 1, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 108. In an embodiment, control algorithm may be configured to create an optimized signal communication as a function of segmentation boundary. As used in this disclosure an "optimized signal communication" is an optimized discrete timing of signal communications. For example, and without limitation, optimized signal communication may include identifying the discrete timing required to transmit and/or receive the one or more segmentation boundaries. In an embodiment, and without limitation, creating optimized signal communication further comprises separating a plurality of signal codes across a communication network, wherein a signal code is described below in detail, in reference to FIG. 3. For example, and without limitation optimized signal communication may determine one or more discrete timings to allow for separation of code across communication networks and/or aircraft components attached to the plurality of flight components, wherein a communication network is described below in detail in reference to FIG. 3. In an embodiment, and without limitation, communication network may include a master bus controller configured to synchronize timing of the plurality of signal codes, wherein a master bus controller is described below in detail, in reference to FIG. 3. For example, and without limitation a master bus controller may synchronize timing of the plurality of signal codes by injecting high priority timing signals on a bus of the master bus control. As used in this disclosure a "high priority timing signal" is information denoting that the information is important. For example, and without limitation, high priority timing signal may denote that a signal code is of high priority and should be analyzed and/or transmitted prior to any other signal codes being analyzed and/or transmitted. In an embodiment, high priority timing signal may include one or more priority packets. As used in this disclosure a "priority packet" is a formatted unit of data carried across the communication network. For example, and without limitation, priority packet may denote that a signal code should be used and/or is of greater priority than other signal codes.

In an embodiment, and still referring to FIG. 1, determining the at least an aircraft response may include receiving a first aircraft command from command sensor 120 attached to aircraft control 112, wherein a first aircraft command may include any of the aircraft command as described above. In an embodiment, and without limitation, aircraft component 116 may obtain from a related flight component of the plurality of flight components an adjustment impact, wherein a related flight component is a second flight component that is distinct from a first flight component. For example, and without limitation, a first flight component may include a propulsor, wherein a second flight component may include a rotor and/or aileron. As used in this disclosure an "adjustment impact" is an effect and/or impact that a change to flight component 108 may have on a related flight component. For example, and without limitation, an adjustment impact may denote that a reduction of torque to a first propulsor may result in an overproduction of torque on a second propulsor. As a further non-limiting example, adjustment impact may denote that a shift of an aileron may result in a torque exerted on the rudder. In an embodiment, and without limitation aircraft component 116 may determine the at least aircraft response as a function of the first aircraft command and the adjustment impact.

Still referring to FIG. 1, system 100 may be configured to include a communication network that allows the aircraft component 116 attached to flight component 108 to communicate with an alternate aircraft component attached to an alternate flight component, wherein a communication network is a pattern and/or direction in which data and/or signals may flow in system 100 as described below in detail in reference to FIG. 3. As used in this disclosure an "alternate aircraft component" is an aircraft component that is different and/or distinct from a first aircraft component. As used in this disclosure an "alternate flight component" is a flight component that is different and/or distinct from a first flight component. For example, and without limitation, an aircraft component attached to a rotor may communicate to an alternate aircraft component attached to an aileron. As a further non-limiting example, an aircraft component attached to a rudder may communicate to an alternate aircraft component of a rotor. In an embodiment, aircraft component 116 may communicate with a plurality of alternate aircraft components as a function of the communication network. For example, and without limitation, aircraft component may communicate with the plurality of alternate aircraft components as a function of one or more chain paths, all-channel paths, and/or neural networks that assign a weighted value to a transmitted datum. As a further non-limiting example, aircraft component may communicate with the plurality of alternate aircraft components as a function of cooperative processing, parallel processing, and the like thereof. In an embodiment, and without limitation, aircraft component 116 may communicate with an alternate aircraft component of the plurality of alternate aircraft components as a function of a wired protocol. As a non-limiting example, aircraft component 116 may communicate with an alternate flight component of the plurality of alternate flight components as a function of a master bus controller, universal asynchronous receiver-transmitters (UART), universal serial buses (USBs), bus architectures, and the like thereof. In another embodiment, and without limitation, aircraft component 116 may communicate with an alternate aircraft component of the plurality of alternate aircraft components as a function of a wireless protocol. For example, and without limitation, aircraft component 116 may communicate with an alternate flight component of the plurality of alternate flight components as a function of a communication using radio waves, electric fields, mobile broadband, Wi-Fi, and/or the BLUETOOTH protocol promulgated by Bluetooth SIG, Inc. of Kirkland, Wash., wherein Bluetooth is a wireless technology used for exchanging data between devices over short distances using ultra high frequency radio waves between 2.402 GHz to 2.480 GHz.

In an embodiment, and still referring to FIG. 1, aircraft component 116 may receive an alternate aircraft command from the alternate aircraft component. As used in this disclosure an "alternate signal" is a communication and/or signal associated with an alternate flight component that is transmitted from an alternate aircraft component of the plurality of alternate aircraft components to aircraft component 116. For example, and without limitation, alternate aircraft component may transmit an alternate signal comprising a propeller rotation of 520 rpms, wherein aircraft component 116, attached to flight component 108, receives the alternate signal. Aircraft component 116 may command flight component 108 as a function of alternate signal. For example, and without limitation, aircraft component 116 may command a rudder to rotate 3° along a vertical axis as a function of an alternate signal relating to an aileron that has raised 1.7° to exert a yaw torque on the aircraft.

Figure 2:
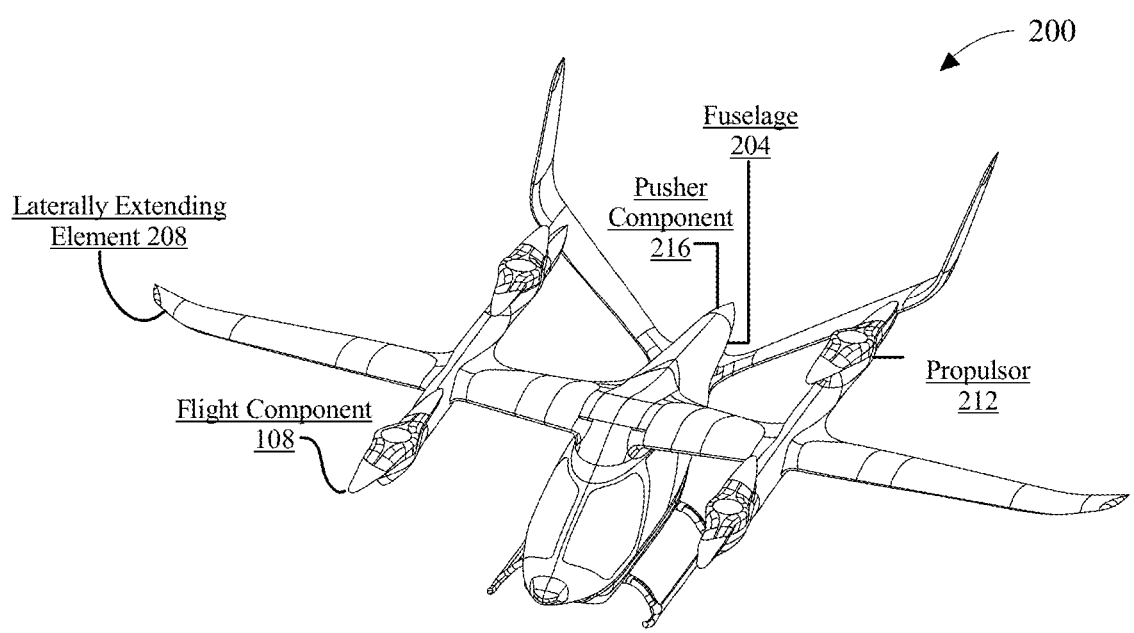
FIG. 2 is a diagrammatic representation of an exemplary embodiment of an aircraft.

Now referring to FIG. 2, an exemplary embodiment of aircraft 104 is illustrated. In an embodiment, and without limitation, aircraft 104 may include a fuselage 204. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 204 may comprise structural elements that physically support the shape and structure of an aircraft. Structural elements may take a plurality of forms, alone or in combination with other types. Structural elements may vary depending on the construction type of aircraft and specifically, the fuselage. Fuselage 204 may comprise a truss structure. A truss structure is often used with a lightweight aircraft and comprises welded steel tube trusses. A truss, as used herein, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later in this paper.

Still referring to FIG. 2, fuselage 204 may comprise geodesic construction. Geodesic structural elements may include stringers wound about formers (which may be alternatively called station frames) in opposing spiral directions. A stringer, as used herein, is a general structural element that comprises a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along the length of the interior of fuselage 204 orthogonal to the longitudinal (nose to tail) axis of the aircraft and forms the general shape of fuselage 204. A former may comprise differing cross-sectional shapes at differing locations along fuselage 204, as the former is the structural element that informs the overall shape of a fuselage 204 curvature. In embodiments, aircraft skin can be anchored to formers and strings such that the outer mold line of the volume encapsulated by the formers and stringers comprises the same shape as aircraft 104 when installed. In other words, former(s) may form a fuselage's ribs, and the stringers may form the interstitials between such ribs. The spiral orientation of stringers about formers provides uniform robustness at any point on an aircraft fuselage such that if a portion sustains damage, another portion may remain largely unaffected. Aircraft skin would be mechanically coupled to underlying stringers and formers and may interact with a fluid, such as air, to generate lift and perform maneuvers.

In an embodiment, and still referring to FIG. 2, fuselage 204 may comprise monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

Still referring to FIG. 2, fuselage 204 can include a semi-monocoque construction. Semi-monocoque construction, as used herein, is a partial monocoque construction, wherein a monocoque construction is describe above detail.

In semi-monocoque construction, fuselage 204 may derive some structural support from stressed aircraft skin and some structural support from underlying frame structure made of structural elements. Formers or station frames can be seen running transverse to the long axis of fuselage 204 with circular cutouts which are generally used in real-world manufacturing for weight savings and for the routing of electrical harnesses and other modern on-board systems. In a semi-monocoque construction, stringers are the thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate that there are numerous methods for mechanical fastening of the aforementioned components like crews, nails, dowels, pins, anchors, adhesives like glue or epoxy, or bolts and nuts, to name a few. A subset of fuselage under the umbrella of semi-monocoque construction is unibody vehicles. Unibody, which is short for "unitized body" or alternatively "unitary construction", vehicles are characterized by a construction in which the body, floor plan, and chassis form a single structure. In the aircraft world, unibody would comprise the internal structural elements like formers and stringers are constructed in one piece, integral to the aircraft skin as well as any floor construction like a deck.

Still referring to FIG. 2, stringers and formers which account for the bulk of any aircraft structure excluding monocoque construction can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. The location of said stringers greatly informs the type of forces and loads applied to each and every stringer, all of which may be handled by material selection, cross-sectional area, and mechanical coupling methods of each member. The same assessment may be made for formers. In general, formers are significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 2, stressed skin, when used in semi-monocoque construction is the concept where the skin of an aircraft bears partial, yet significant, load in the overall structural hierarchy. In other words, the internal structure, whether it be a frame of welded tubes, formers and stringers, or some combination, is not sufficiently strong enough by design to bear all loads. The concept of stressed skin is applied in monocoque and semi-monocoque construction methods of fuselage 204. Monocoque comprises only structural skin, and in that sense, aircraft skin undergoes stress by applied aerodynamic fluids imparted by the fluid. Stress as used in continuum mechanics can be described in pound-force per square inch (lbf/in$^2$) or Pascals (Pa). In semi-monocoque construction stressed skin bears part of the aerodynamic loads and additionally imparts force on the underlying structure of stringers and formers.

Still referring to FIG. 2, aircraft 104 may include a plurality of laterally extending elements 208 attached to fuselage 204. As used in this disclosure a "laterally extending element" is an element that projects essentially horizontally from fuselage, including an outrigger, a spar, and/or a fixed wing that extends from fuselage 204. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element 208 may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element 208 may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 2, aircraft 104 may include at least a propulsor 212. As used in this disclosure a "propulsor" is a component and/or device used to propel a craft by exerting force on a fluid medium, which may include a gaseous medium such as air or a liquid medium such as water. In an embodiment, when a propulsor twists and pulls air behind it, it will, at the same time, push an aircraft forward with an equal amount of force and/or thrust. The more air pulled behind an aircraft, the greater the thrust with which the aircraft is pushed forward. Propulsor 212 may include any device or component that consumes electrical power on demand to propel an electric aircraft in a direction or other vehicle while on ground or in-flight. In an embodiment, propulsor 212 may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, aircraft 104 may include a pusher component 216. As used in this disclosure a "pusher component" is a component that pushes and/or thrusts an aircraft through a medium. As a non-limiting example, pusher component 216 may include a pusher component such as a pusher propeller, a pusher motor, a pusher propulsor, and the like. Additionally, or alternatively, pusher component 216 may include a plurality of pusher components.

Figure 3:
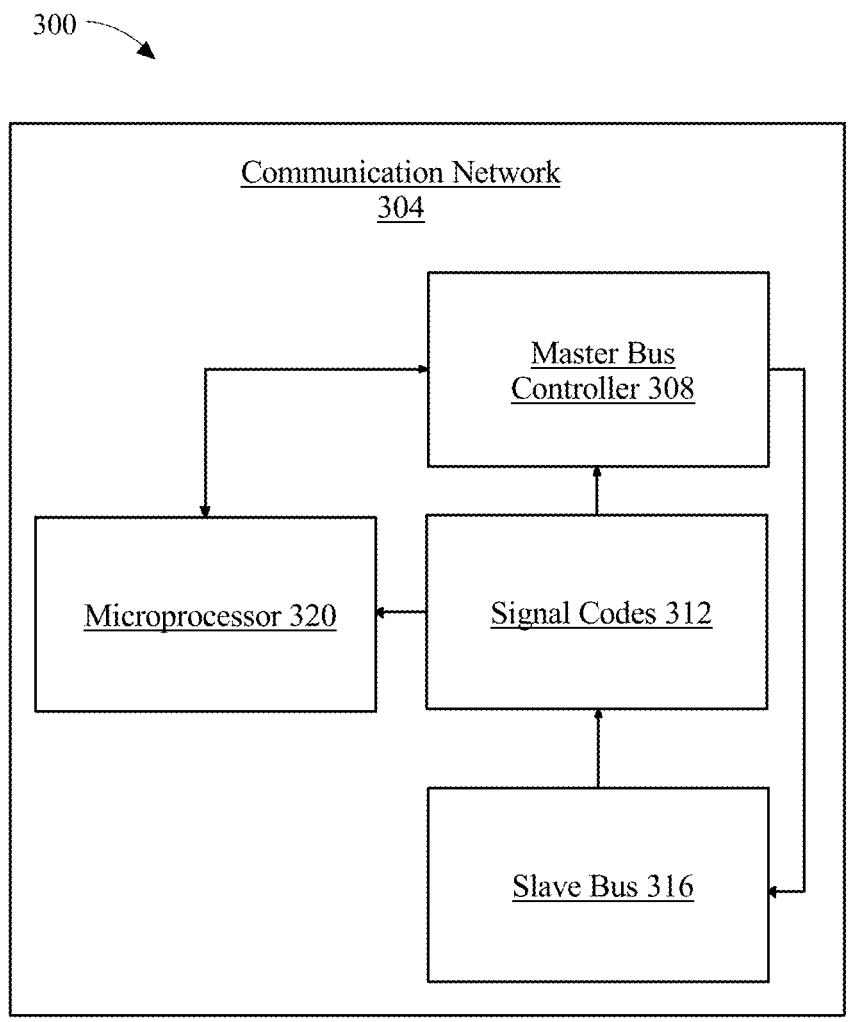
FIG. 3 is a block diagram of an exemplary embodiment of a master bus controller.

Now referring to FIG. 3, an exemplary embodiment 300 of a communication network 304. As used in this disclosure a "communication network" is a pattern and/or direction in which data and/or signals may flow in system 100. For example, and without limitation communication network 304 may include one or more formal networks, wherein formal networks transmit data along an authority chain and/or are limited to task-related communications. As a further non-limiting example, communication network 304 may include informal networks, wherein informal networks transmit data in any direction. In an embodiment, and without limitation, communication network 304 may include a chain path, wherein a "chain path," as used herein, is a linear communication path comprising a hierarchy that data may flow through. In an embodiment, and without limitation, communication network 304 may include an all-channel path, wherein an "all-channel path," as used herein, is a communication path that is not restricted to a particular direction, for example data may be transmitted upward, downward, laterally, and the like thereof. In an embodiment, and without limitation, communication network may include one or more neural networks that assign a weighted value to a transmitted datum. For example, and without limitation, a weighted value may be assigned as a function of one or more data signals denoting that a flight component is malfunctioning and/or in a failure state.

Still referring to FIG. 3, communication network 304 may include a master bus controller 308. As used in this disclosure a "master bus controller" is one or more devices and/or components that are connected to a bus to initiate a direct memory access transaction, wherein a bus is one or more terminals in a bus architecture. For example, and without limitation master bus controller 308 may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller 308 may be configured to perform bus arbitration. As used in this disclosure "bus arbitration" is method and/or scheme to prevent multiple buses from attempting to communicate with and/or connect to master bus controller 308. For example and without limitation, bus arbitration may include one or more schemes such as a small computer interface system, wherein a small computer interface system is a set of standards for physical connecting and transferring data between peripheral devices and master bus controller 308 by defining commands, protocols, electrical, optical, and/or logical interfaces. In an embodiment, master bus controller 308 may receive a plurality of signal codes 312. As used in this disclosure a "signal code" is a code and/or representation of information to convey a communication. In an embodiment, and without limitation, signal code 312 may include one or more analog-to-digital conversions, low bit rate transmissions, message encryptions, digital signals, binary signals, logic signals, analog signals, and the like thereof.

Still referring to FIG. 3, master bus controller 308 may receive the plurality of signal codes 312 from a slave bus 316. As used in this disclosure a "slave bus" is one or more peripheral devices and/or components that initiate a bus transfer. For example, and without limitation, slave bus 316 may receive one or more controls and/or asymmetric communications from master bus controller 308, wherein slave bus 316 transfers data stored to master bus 308. In an embodiment, and without limitation, slave bus 316 may include one or more internal buses, such as but not limited to a/an internal data bus, memory bus, system bus, front-side bus, and the like thereof. In another embodiment, and without limitation, slave bus 316 may include one or more external buses such as external computers, remote devices, printers, aircraft computer systems, flight control systems, and the like thereof. Additionally or alternatively, master bus controller 316 may receive one or more signal codes, wherein master bus controller 316 may transmit the signal codes to a microprocess 320. As used in this disclosure a "microprocessor" is an integrated circuit capable of performing data processing logic and/or control. In an embodiment, and without limitation, microprocessor 320 may include one or more programmable logic devices that may read and/or interpret binary instructions from master bus controller 308. In another embodiment, and without limitation, microprocessor 320 may read and/or interpret signal code 312 and transmit the encoded and/or decoded signal to master bus controller 308. For example, and without limitation, microprocessor 316 may perform arithmetic and/or logical operations utilizing signal code 312 and/or data transmitted from master bus controller 308 and transmit the output to master bus controller 308.

Figure 4:
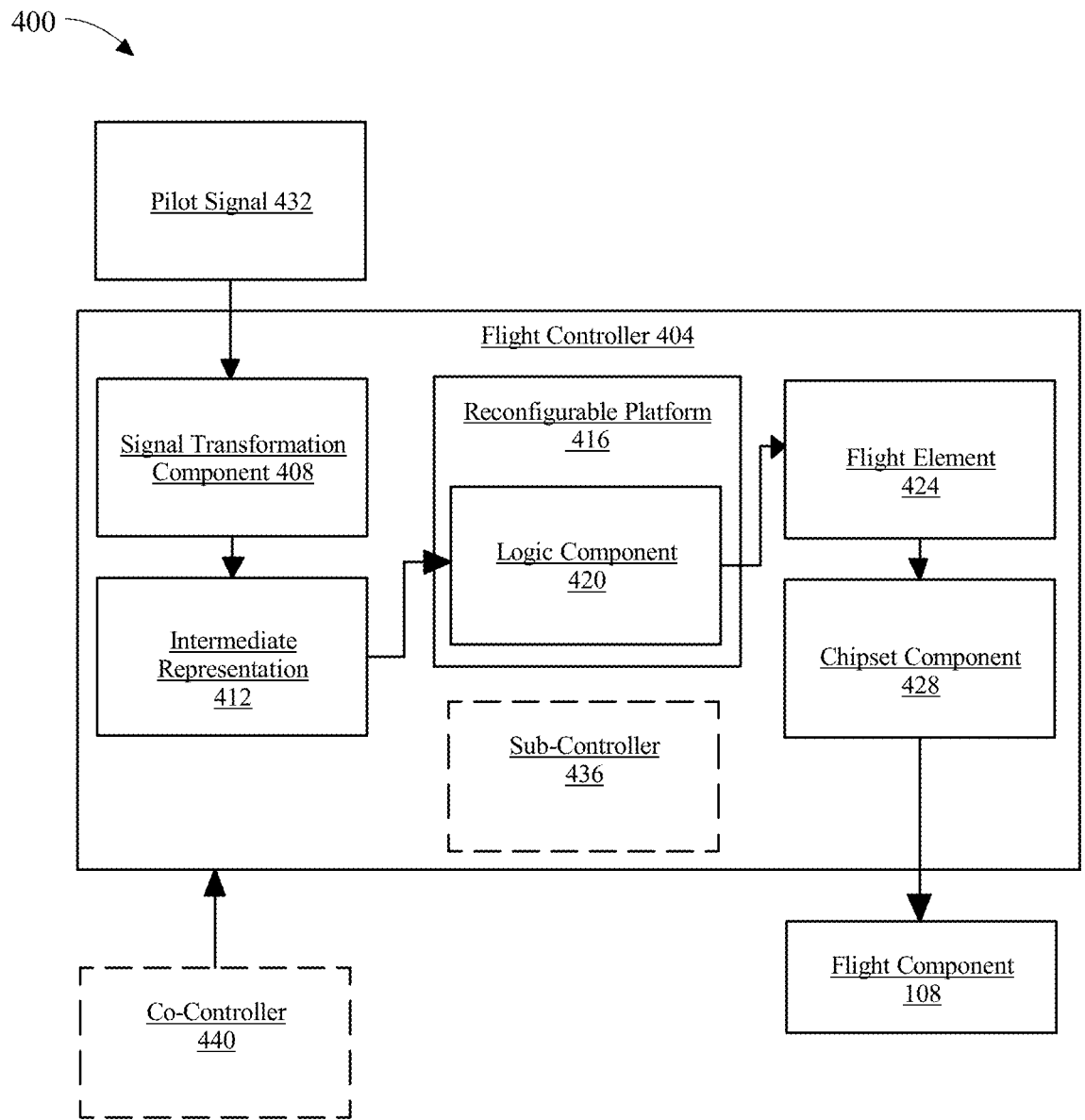
FIG. 4 is a block diagram of an exemplary embodiment of a flight controller.

Now referring to FIG. 4, an exemplary embodiment 400 of a flight controller 404 is illustrated. As used in this disclosure a "flight controller" is a computing device of a plurality of computing devices dedicated to data storage, security, distribution of traffic for load balancing, and flight instruction. Flight controller 404 may include and/or communicate with any computing device as described in this disclosure, including without limitation a microcontroller, microprocessor, digital signal processor (DSP) and/or system on a chip (SoC) as described in this disclosure. Further, flight controller 404 may include a single computing device operating independently, or may include two or more computing device operating in concert, in parallel, sequentially or the like; two or more computing devices may be included together in a single computing device or in two or more computing devices. In embodiments, flight controller 404 may be installed in an aircraft, may control the aircraft remotely, and/or may include an element installed in the aircraft and a remote element in communication therewith.

In an embodiment, and still referring to FIG. 4, flight controller 404 includes a signal transformation component 408. As used in this disclosure a "signal transformation component" is a component that transforms and/or converts a first signal to a second signal, wherein a signal may include one or more digital and/or analog signals. For example, and without limitation, signal transformation component 408 may be configured to perform one or more operations such as preprocessing, lexical analysis, parsing, semantic analysis, and the like thereof. In an embodiment, and without limitation, signal transformation component 408 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 408 may include transforming one or more low-level languages such as, but not limited to, machine languages and/or assembly languages. For example, and without limitation, signal transformation component 408 may include transforming a binary language signal to an assembly language signal. In an embodiment, and without limitation, signal transformation component 408 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 4, signal transformation component 408 is configured to optimize an intermediate representation 412. As used in this disclosure an "intermediate representation" is a data structure and/or code that represents the input signal. Signal transformation component 408 may optimize intermediate representation as a function of a data-flow analysis, dependence analysis, alias analysis, pointer analysis, escape analysis, and the like thereof. In an embodiment, and without limitation, signal transformation component 408 may optimize intermediate representation 412 as a function of one or more inline expansions, dead code eliminations, constant propagation, loop transformations, and/or automatic parallelization functions. In another embodiment, signal transformation component 408 may optimize intermediate representation as a function of a machine dependent optimization such as a peephole optimization, wherein a peephole optimization may rewrite short sequences of code into more efficient sequences of code. Signal transformation component 408 may optimize intermediate representation to generate an output language, wherein an "output language," as used herein, is the native machine language of flight controller 404. For example, and without limitation, native machine language may include one or more binary and/or numerical languages.

In an embodiment, and without limitation, signal transformation component 408 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller 404 may include a reconfigurable hardware platform 416. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 416 may be reconfigured to enact any algorithm and/or algorithm selection process received from another computing device and/or created using machine-learning processes.

Still referring to FIG. 4, reconfigurable hardware platform 416 may include a logic component 420. As used in this disclosure a "logic component" is a component that executes instructions on output language. For example, and without limitation, logic component may perform basic arithmetic, logic, controlling, input/output operations, and the like thereof. Logic component 420 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 420 may be organized according to Von Neumann and/or Harvard architecture as a non-limiting example. Logic component 420 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 420 may include one or more integrated circuit microprocessors, which may contain one or more central processing units, central processors, and/or main processors, on a single metal-oxide-semiconductor chip. Logic component 420 may be configured to execute a sequence of stored instructions to be performed on the output language and/or intermediate representation 412. Logic component 420 may be configured to fetch and/or retrieve the instruction from a memory cache, wherein a "memory cache," as used in this disclosure, is a stored instruction set on flight controller 404. Logic component 420 may be configured to decode the instruction retrieved from the memory cache to opcodes and/or operands. Logic component 420 may be configured to execute the instruction on intermediate representation 412 and/or output language. For example, and without limitation, logic component 420 may be configured to execute an addition operation on intermediate representation 412 and/or output language.

In an embodiment, and without limitation, logic component 420 may be configured to calculate a flight element 424. As used in this disclosure a "flight element" is an element of datum denoting a relative status of aircraft 400. For example, and without limitation, flight element 424 may denote one or more torques, thrusts, airspeed velocities, forces, altitudes, groundspeed velocities, directions during flight, directions facing, forces, orientations, and the like thereof. For example, and without limitation, flight element 424 may denote that aircraft 400 is cruising at an altitude and/or with a sufficient magnitude of forward thrust. As a further non-limiting example, flight status may denote that 400 is building thrust and/or groundspeed velocity in preparation for a takeoff. As a further non-limiting example, flight element 424 may denote that aircraft 400 is following a flight path accurately and/or sufficiently.

Still referring to FIG. 4, flight controller 404 may include a chipset component 428. As used in this disclosure a "chipset component" is a component that manages data flow. In an embodiment, and without limitation, chipset component 428 may include a northbridge data flow path, wherein the northbridge dataflow path may manage data flow from logic component 420 to a high-speed device and/or component, such as a RAM, graphics controller, and the like thereof. In another embodiment, and without limitation, chipset component 428 may include a southbridge data flow path, wherein the southbridge dataflow path may manage data flow from logic component 420 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 428 may manage data flow between logic component 420, memory cache, and flight component 108. For example, and without limitation, chipset component 428 may transmit to an aircraft rotor to reduce torque of a first lift propulsor and increase the forward thrust produced by a pusher component to perform a flight maneuver.

In an embodiment, and still referring to FIG. 4, flight controller 404 may be configured generate an autonomous function. As used in this disclosure an "autonomous function" is a mode and/or function of flight controller 404 that controls aircraft 400 automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 424. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft 400 and/or the maneuvers of aircraft 400 in its entirety.

In an embodiment, and still referring to FIG. 4, flight controller 404 may generate autonomous function as a function of an autonomous machine-learning model. As used in this disclosure an "autonomous machine-learning model" is a machine-learning model to produce an autonomous function output given flight element 424 and a pilot signal 432 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 432 may denote that a pilot is controlling and/or maneuvering ailerons, wherein the pilot is not in control of the rudders and/or propulsors. In an embodiment, pilot signal 432 may include an implicit signal and/or an explicit signal. For example, and without limitation, pilot signal 432 may include an explicit signal, wherein the pilot explicitly states there is a lack of control and/or desire for autonomous function. As a further non-limiting example, pilot signal 432 may include an explicit signal directing flight controller 404 to control and/or maintain a portion of aircraft 400, a portion of the flight plan, the entire aircraft, and/or the entire flight plan. As a further non-limiting example, pilot signal 432 may include an implicit signal, wherein flight controller 404 detects a lack of control such as by a malfunction, torque alteration, flight path deviation, and the like thereof. In an embodiment, and without limitation, pilot signal 432 may include one or more explicit signals to reduce torque, and/or one or more implicit signals that torque may be reduced due to reduction of airspeed velocity. In an embodiment, and without limitation, pilot signal 432 may include one or more local and/or global signals. For example, and without limitation, pilot signal 432 may include a local signal that is transmitted by a pilot and/or crew member. As a further non-limiting example, pilot signal 432 may include a global signal that is transmitted by air traffic control and/or one or more remote users that are in communication with the pilot of aircraft 400. In an embodiment, pilot signal 432 may be received as a function of a tri-state bus and/or multiplexor that denotes an explicit pilot signal should be transmitted prior to any implicit or global pilot signal.

Still referring to FIG. 4, autonomous machine-learning model may include one or more autonomous machine-learning processes such as supervised, unsupervised, or reinforcement machine-learning processes that flight controller 404 and/or a remote device may or may not use in the generation of autonomous function. As used in this disclosure "remote device" is an external device to flight controller 404. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 4, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 404 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 4, flight controller 404 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 404. Remote device and/or FPGA may transmit a signal, bit, datum, or parameter to flight controller 404 that at least relates to autonomous function. Additionally or alternatively, the remote device and/or FPGA may provide an updated machine-learning model. For example, and without limitation, an updated machine-learning model may be comprised of a firmware update, a software update, a autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 404 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 4, flight controller 404 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 4, flight controller 404 may include, but is not limited to, for example, a cluster of flight controllers in a first location and a second flight controller or cluster of flight controllers in a second location. Flight controller 404 may include one or more flight controllers dedicated to data storage, security, distribution of traffic for load balancing, and the like. Flight controller 404 may be configured to distribute one or more computing tasks as described below across a plurality of flight controllers, which may operate in parallel, in series, redundantly, or in any other manner used for distribution of tasks or memory between computing devices. For example, and without limitation, flight controller 404 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 108. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, the plurality of flight controllers may include a master bus controller, wherein a master bus controller is described above in detail. Master bus controller may communicate using synchronous and/or asynchronous bus control protocols. In an embodiment, master bus controller may include flight controller 404. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 412 and/or output language from logic component 420, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 4, flight controller 404 may also be implemented using a "shared nothing" architecture in which data is cached at the worker, in an embodiment, this may enable scalability of aircraft and/or computing device. Flight controller 404 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 4, flight controller may include a sub-controller 436. As used in this disclosure a "sub-controller" is a controller and/or component that is part of a distributed controller as described above; for instance, flight controller 404 may be and/or include a distributed flight controller made up of one or more sub-controllers. For example, and without limitation, sub-controller 436 may include any controllers and/or components thereof that are similar to distributed flight controller and/or flight controller as described above. Sub-controller 436 may include any component of any flight controller as described above. Sub-controller 436 may be implemented in any manner suitable for implementation of a flight controller as described above. As a further non-limiting example, sub-controller 436 may include one or more processors, logic components and/or computing devices capable of receiving, processing, and/or transmitting data across the distributed flight controller as described above. As a further non-limiting example, sub-controller 436 may include a controller that receives a signal from a first flight controller and/or first distributed flight controller component and transmits the signal to a plurality of additional sub-controllers and/or flight components.

Still referring to FIG. 4, flight controller may include a co-controller 440. As used in this disclosure a "co-controller" is a controller and/or component that joins flight controller 404 as components and/or nodes of a distributer flight controller as described above. For example, and without limitation, co-controller 440 may include one or more controllers and/or components that are similar to flight controller 404. As a further non-limiting example, co-controller 440 may include any controller and/or component that joins flight controller 404 to distributer flight controller. As a further non-limiting example, co-controller 440 may include one or more processors, logic components and/or computing devices capable of receiving, processing, and/or transmitting data to and/or from flight controller 404 to distributed flight control system. Co-controller 440 may include any component of any flight controller as described above. Co-controller 440 may be implemented in any manner suitable for implementation of a flight controller as described above.

In an embodiment, and with continued reference to FIG. 4, flight controller 404 may be designed and/or configured to perform any method, method step, or sequence of method steps in any embodiment described in this disclosure, in any order and with any degree of repetition. For instance, flight controller 404 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 5:
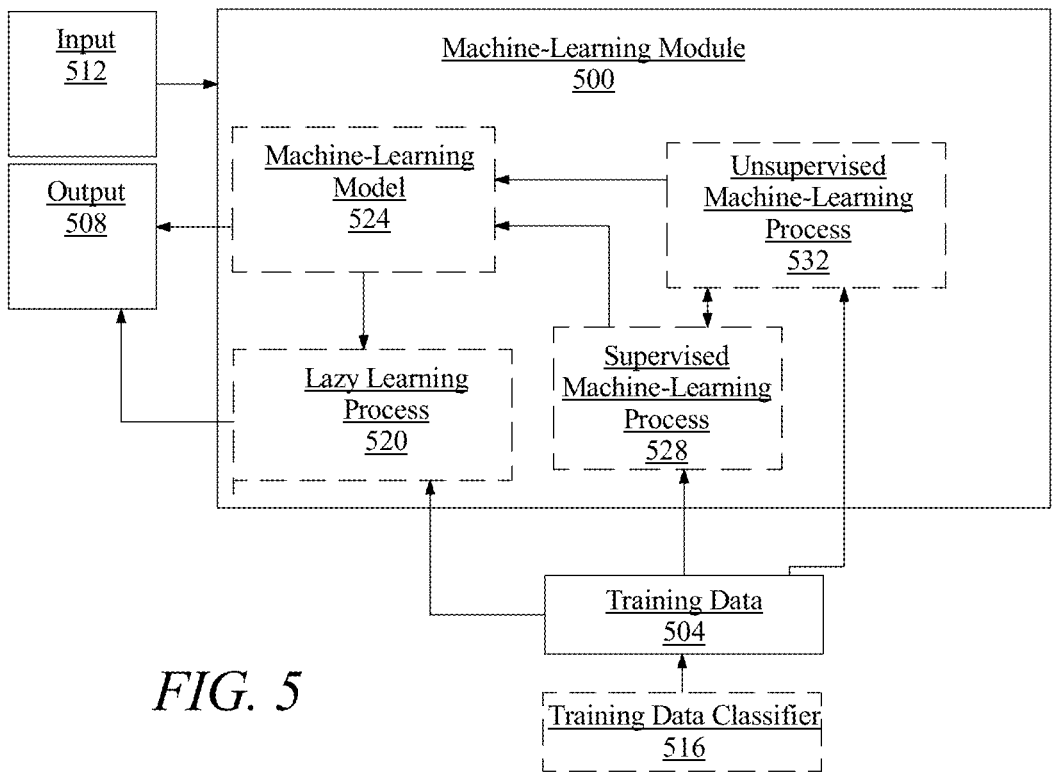
FIG. 5 is a block diagram of an exemplary embodiment of a machine-learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example flight elements and/or pilot signals may be inputs, wherein an output may be an autonomous function.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
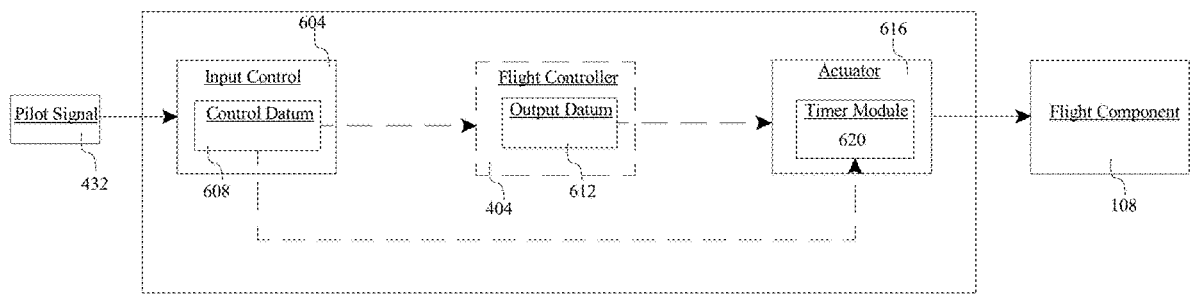
FIG. 6 is a block diagram of an exemplary embodiment of a fall back flight control system.

Now referring to FIG. 6, segmented control algorithm may be received as a function of a fall back flight control system 600. As used in this disclosure a "fall back flight control system" is one or more systems capable of determining a segmented control algorithm in a failure event. In an embodiment, and without limitation, fall back flight control system 600 may include an input control 604. In an embodiment, and without limitation, fall back flight control system 600 may include any fall back flight control system 600 used as a fall back flight control system described in U.S. patent application Ser. No. 17/179,826 and titled "METHODS AND SYSTEMS FOR FALL BACK FLIGHT CONTROL CONFIGURED FOR USE IN ELECTRIC AIRCRAFT", which is incorporated herein by reference in its entirety. Input control 604 may include a throttle lever, inceptor stick, collective pitch control, steering wheel, brake pedals, pedal controls, toggles, joystick. One of ordinary skill in the art, upon reading the entirety of this disclosure would appreciate the variety of input controls that may be present in an electric aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety. Additionally, or alternatively, input control 604 may include one or more data sources providing raw data. "Raw data", for the purposes of this disclosure, is data representative of aircraft information that has not been conditioned, manipulated, or processed in a manner that renders data unrepresentative of aircraft information. Input control 604 may be exterior sensor data, interior sensor data, data retrieved from one or more remotely or onboard computing devices. Input control 604 may include audiovisual data, pilot voice data, biometric data, or a combination thereof. Input control 604 may include information or raw data gathered from gyroscopes, inertial measurement units (IMUs), motion sensors, a combination thereof, or another sensor or grouping of sensors. The IMU may, in non-limiting embodiments, may broadcast attitude information relating to the aircraft for use by one or more other components in the system 600. For example, and without limitation, the broadcast attitude information by IMU may be used as input control 604 for use by one or more inverters and combined with input controls 604 for a reduced control. Input control 604 may be physically located in the cockpit of the aircraft or remotely located outside of the aircraft in another location communicatively coupled to at least a portion of the aircraft wherein "communicatively couple", for the purposes of this disclosure, is a process whereby one device, component, or circuit is able to receive data from and/or transmit data to another device, component, or circuit; communicative coupling may be performed by wired or wireless electronic communication, either directly or by way of one or more intervening devices or components. In an embodiment, communicative coupling includes electrically coupling an output of one device, component, or circuit to an input of another device, component, or circuit. Communicative coupling may be performed via a bus or other facility for intercommunication between elements of a computing device. Communicative coupling may include indirect connections via "wireless" connection, low power wide area network, radio communication, optical communication, magnetic, capacitive, or optical coupling, or the like.

In an embodiment, and still referring to FIG. 6, input control 604 may include buttons, switches, or other binary inputs in addition to, or alternatively than digital controls about which a plurality of inputs may be received. Input control 604 is configured to receive pilot signal 428, wherein pilot signal 428 is described above in detail, in reference to FIGS. 1-5. In an embodiment, input control 604 may be configured to generate a control datum 608 as a function of pilot signal 428. Control datum 608 may indicate a pilot's desire to change the heading or trim of an electric aircraft. Control datum 608 may indicate a pilot's desire to change an aircraft's pitch, roll, yaw, or throttle. "Pitch", for the purposes of this disclosure refers to an aircraft's angle of attack, that is the difference between the aircraft's nose and the horizontal flight trajectory. For example, an aircraft pitches "up" when its nose is angled upward compared to horizontal flight, like in a climb maneuver. In another example, the aircraft pitches "down", when its nose is angled downward compared to horizontal flight, like in a dive maneuver. "Roll" for the purposes of this disclosure, refers to an aircraft's position about it's longitudinal axis, that is to say that when an aircraft rotates about its axis from its tail to its nose, and one side rolls upward, like in a banking maneuver. "Yaw", for the purposes of this disclosure, refers to an aircraft's turn angle, when an aircraft rotates about an imaginary vertical axis intersecting the center of the earth and the fuselage of the aircraft. "Throttle", for the purposes of this disclosure, refers to an aircraft outputting an amount of thrust from a propulsor. Pilot signal 428, when referring to throttle, may refer to a pilot's desire to increase or decrease thrust produced by at least a propulsor. Control datum 608 may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Control datum 608 may include circuitry, computing devices, electronic components or a combination thereof that translates pilot signal 428 into at least an electronic signal configured to be transmitted to another electronic component.

With continued reference to FIG. 6, fall back flight control system 600 may include flight controller 404. Flight controller 404 includes any of the flight controller 404 as described above, in reference to FIGS. 1-5. Flight controller 404 may be configured to generate an output datum 620 as a function of the control datum 608. Output datum 612 may include an electrical signal consistent with the description of electrical signals regarding control datum 116. Output datum 612 includes an electrical signal configured to be transmitted to at least a portion of the aircraft, namely an actuator mechanically coupled to at least a portion of the aircraft that manipulates a fluid medium to change an aircraft's pitch, roll, yaw, or throttle.

With continued reference to FIG. 6, fall back flight control system 600 may include an actuator 616 which is communicatively coupled to the input control 604 and flight controller 404. Actuator 616 may include a computing device or plurality of computing devices consistent with the entirety of this disclosure. Actuator 616 may be designed and/or configured to perform any method, method step, or sequence of method steps in any embodiment described in this disclosure, in any order and with any degree of repetition. For instance, flight actuator 616 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Actuator 616 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Actuator 616 may include a piston and cylinder system configured to utilize hydraulic pressure to extend and retract a piston coupled to at least a portion of electric aircraft. Actuator 616 may include a stepper motor or server motor configured to utilize electrical energy into electromagnetic movement of a rotor in a stator. Actuator 616 may include a system of gears coupled to an electric motor configured to convert electrical energy into kinetic energy and mechanical movement through a system of gears. Actuator 616 may include one or more inverters capable of driving one or more propulsors consistent with the entirety of this disclosure utilizing the herein disclosed system. Actuator 616, one of the combination of components thereof, or another component configured to receive data from flight controller 404 and input control 604, if loss of communication is detected, may be configured to implement a reduced function controller. The reduced function controller may directly react directly to input control 604, or other raw data inputs, as described in the entirety of this disclosure. Actuator 616 may include components, processors, computing devices, or the like configured to detect, as a function of time, loss of communication with flight controller 404. Actuator 616 may include timer module 620 configured to time all communication to and from actuator 616 and in particular, to detect that flight controller 404 has not transmitted output datum 612 to actuator 616 within a particular time limit, and thus, communication is likely lost. Timer module 620 may then be configured to receive control datum 608 directly from input control 604. The amount of time that timer module 620 keeps track of before switching actuator input to control datum 608 command may be configurable to a preset time, a time of day, or a time input by another component in fall back control system 600. Actuator 616 may be configured to receive control datum 608 from input control 604 and receive output datum 612 from flight controller 404. Actuator 616 is configured to move at least a flight component 108 of the electric aircraft as a function of output datum 612, wherein flight component 108 includes any of the flight component as described above, in reference to FIGS. 1-5. Output datum 612 indicates a desired change in aircraft heading or thrust, flight controller 404 translates control datum 608 into output datum 612. That is to say that flight controller 404 may be configured to translate a pilot input, in the form of moving an inceptor stick, for example, into electrical signals to at least an actuator 616 that in turn, moves at least a portion of the aircraft in a way that manipulates a fluid medium, like air, to accomplish the pilot's desired maneuver. At least a portion of the aircraft that the actuator 616 moves may be a control surface.

With continued reference to FIG. 6, actuator 616 may have a primary mode wherein the actuator is configured to move at least a portion of the aircraft as a function of the output datum 612 received from flight controller 404. Actuator 616 has a fall back mode wherein the actuator is configured to move at least a portion of the aircraft as a function of the control datum 608 received from input control 604. Actuator 616 may be configured to detect loss of communication with flight controller 404, as a function of time, and select, as a function of the detection, the fall back mode. Actuator 616 may be configured to move control surfaces of the aircraft in one or both of its two main modes of locomotion, or adjust thrust produced at any of the propulsors. These electronic signals may be translated to aircraft control surfaces. These control surfaces, in conjunction with forces induced by environment and propulsion systems, may be configured to move the aircraft through a fluid medium, an example of which is air, wherein a "control surface" as described herein, is any form of a mechanical linkage with a surface area that interacts with forces to move an aircraft. A control surface may include, as a non-limiting example, ailerons, flaps, leading edge flaps, rudders, elevators, spoilers, slats, blades, stabilizers, stabilators, airfoils, a combination thereof, or any other mechanical surface are used to control an aircraft in a fluid medium.

Figure 7:
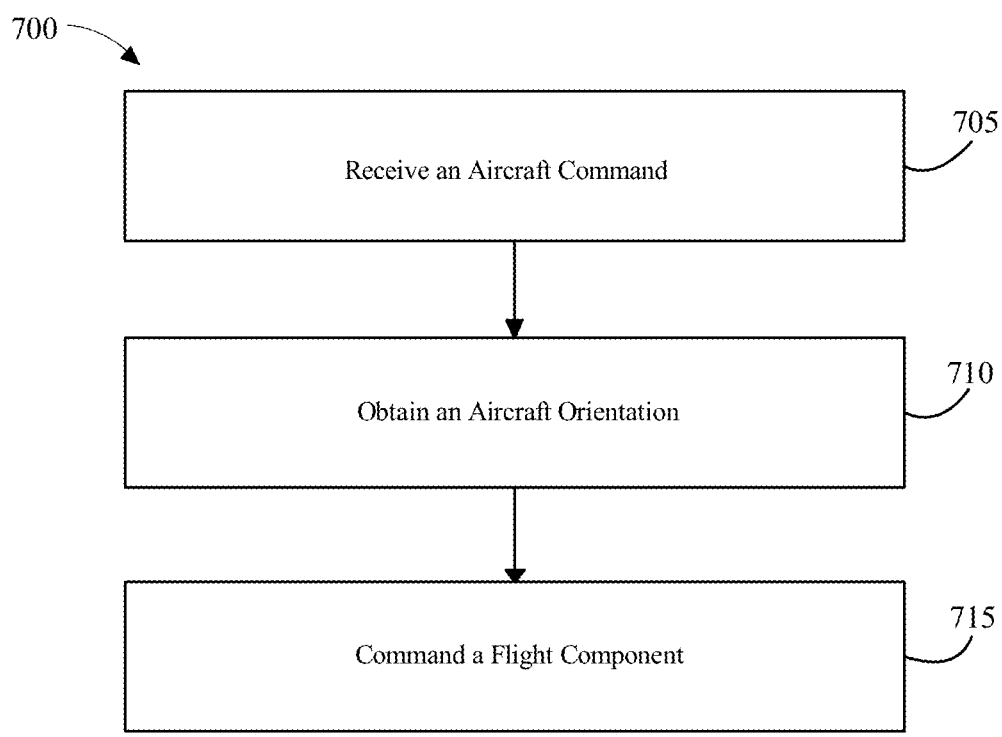
FIG. 7 is a flow diagram illustrating an exemplary embodiment of a method for distributed flight control.

Now referring to FIG. 7, a method of an exemplary embodiment 700 for distributed control of an aircraft is illustrated. At step 705, an aircraft component 116 receives an aircraft command from a command sensor 120 attached to an aircraft control 112. Aircraft component 116 includes any of the aircraft component 116 as described above, in reference to FIGS. 1-6. Aircraft command includes any of the aircraft command as described above, in reference to FIGS. 1-6. Command sensor 120 includes any of the command sensor 120 as described above, in reference to FIGS. 1-6. Aircraft control 112 includes any of the aircraft control 112 as described above, in reference to FIGS. 1-6.

Still referring to FIG. 7, at step 710, aircraft component 116 obtains an aircraft orientation from an attitude sensor 124. Aircraft orientation includes any of the aircraft orientation as described above, in reference to FIGS. 1-6. Attitude sensor 124 includes any of the attitude sensor 124 as described above, in reference to FIGS. 1-6.

Still referring to FIG. 7, at step 715, aircraft component 116 commands a plurality of flight components 108 to produce a response command. Plurality of flight components 108 includes any of the plurality of flight components 108 as described above, in reference to FIGS. 1-6. Response command includes any of the response command as described above, in reference to FIGS. 1-6.

Figure 8:
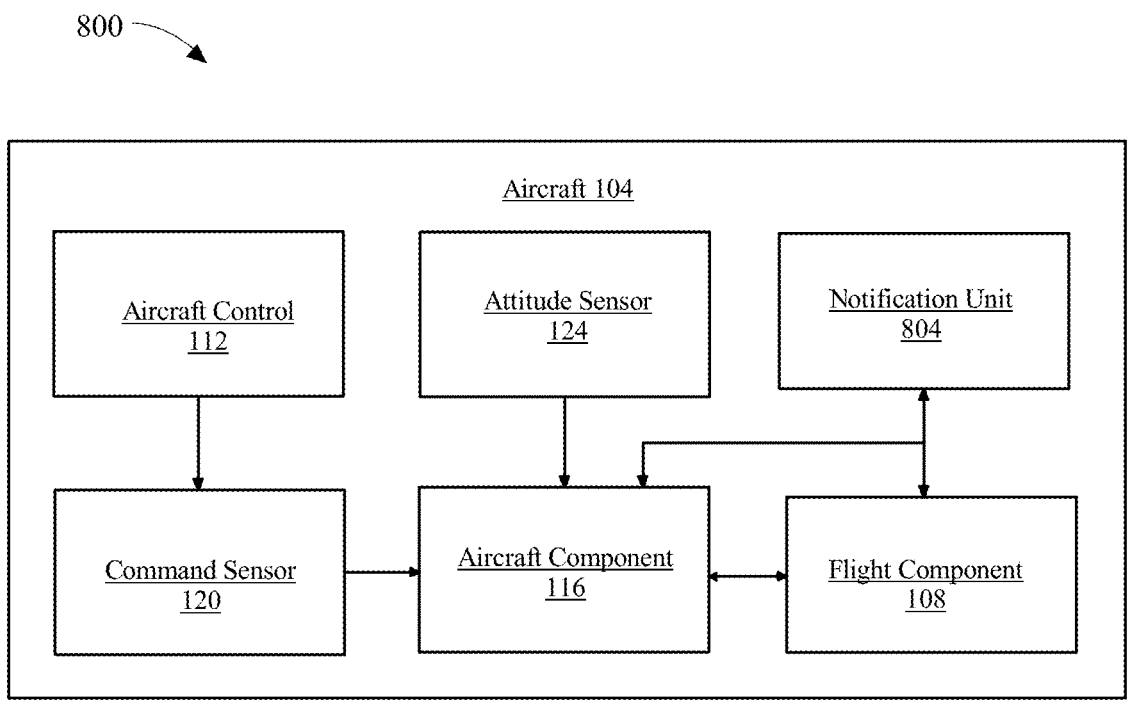
FIG. 8 is a block diagram of an exemplary embodiment of a system for distributed pilot control for an aircraft.

Now referring to FIG. 8, an exemplary embodiment of a system 800 for distributed pilot control for an aircraft 104 is illustrated. Aircraft 104 includes any of the aircraft 104 as described above, in reference to FIGS. 1-7. System 800 includes a plurality of flight components 108. Flight components 108 includes any of the flight components as described above, in reference to FIGS. 1-7. System 100 includes an aircraft control 112 located within aircraft 104. Aircraft control 112 includes any of the aircraft control 112 as described above, in reference to FIGS. 1-7. System 800 includes an aircraft component 116 attached to a flight component 108 of the plurality of flight components. Aircraft component 116 includes any of the aircraft component 116 as described above, in reference to FIGS. 1-7. Aircraft component 116 is configured to receive an aircraft command from a command sensor 120. Aircraft command includes any of the aircraft command as described above, in reference to FIGS. 1-7. Command sensor 120 includes any of the command sensor 120 as described above, in reference to FIGS. 1-7. Aircraft component 116 is configured to obtain an aircraft orientation from an attitude sensor 124. Aircraft orientation includes any of the aircraft orientation as described above, in reference to FIGS. 1-7. Attitude sensor 124 includes any of the attitude sensor 124 as described above, in reference to FIGS. 1-7.

Still referring to FIG. 8, aircraft component 116 receives a pilot signal 432 as a function of a notification unit 804. Pilot signal 432 includes any of the pilot signal 432 as described above, in reference to FIGS. 1-7. As used in this disclosure a "notification unit" is a component capable of producing and/or emitting a notification and/or signal to a pilot. In an embodiment, and without limitation, notification unit 804 may include a graphical user interface (GUI). For the purposes of this disclosure, a "graphical user interface" is a device configured to present data or information in a visual manner to a pilot, computer, camera or combination thereof. Notification unit 804 may be configured to display information regarding aircraft 104. Notification unit 804 may be configured to display information regarding a failure of a flight component and/or a failure of an energy source. Notification unit 804 may prompt a pilot to input a pilot signal as a function of a required interaction and/or response. Notification unit 804 may be configured to receive haptic, audio, visual, gesture, passkey, or other type of interaction from the pilot. Notification unit 804 may perform one or more functions in response to the interaction from the pilot. In non-limiting examples, and without limitation, notification unit 804 may transmit a pilot signal 432 to flight controller 404 when an affirmative interaction is received from the pilot, the signal indicating to transmit one or more signals to other components communicatively connected thereto, such as flight component 108. Notification unit 804 may operate independent to aircraft component 116 and any other component communicatively connected thereto. For example and without limitation, notification unit 804 may indicate to the pilot that an energy source has a certain level of charge and aircraft 104 may operate autonomously to adjust one or more electrical commands regardless of the notification to the pilot. Aircraft component 116 may command flight component 108 to produce a response command as a function of pilot signal 432. Response command may include any response command as described above, in reference to FIGS. 1-7.

Figure 9:
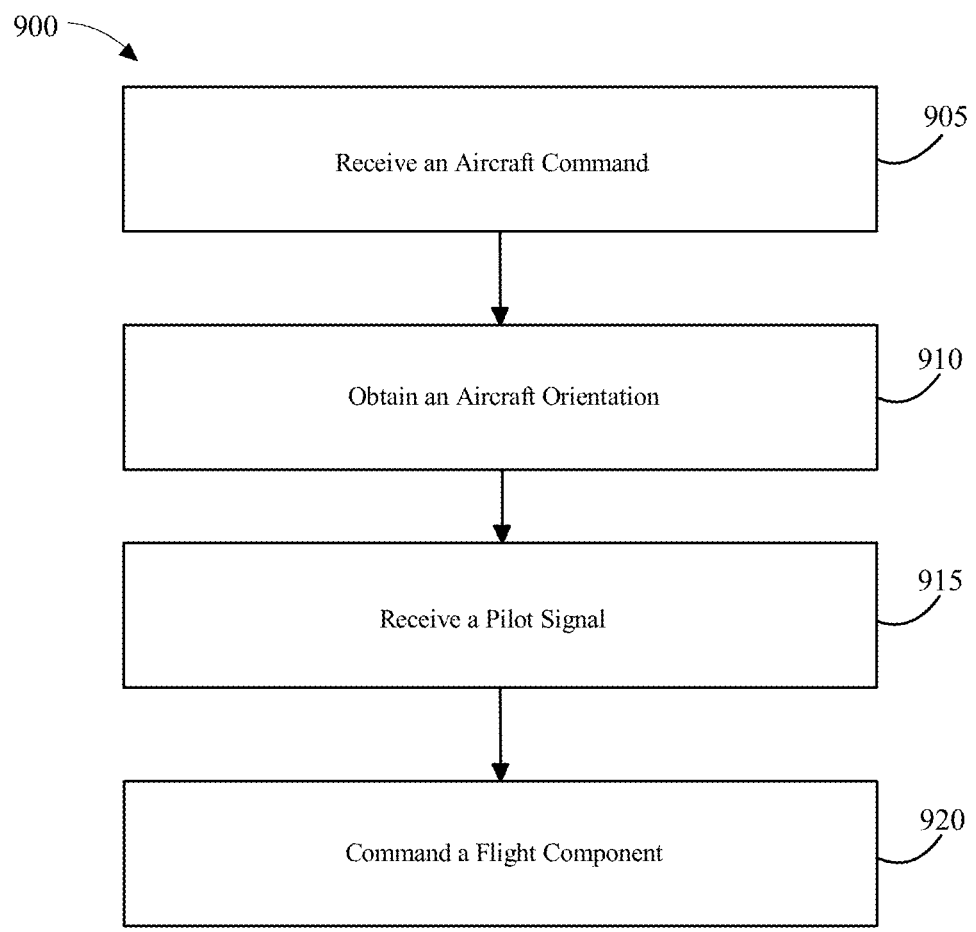
FIG. 9 is a flow diagram illustrating an exemplary embodiment of a method for distributed pilot control for an aircraft.

Now referring to FIG. 9 an exemplary embodiment 900 of a method for distributed pilot control for an aircraft is illustrated. At step 905, an aircraft component 116 receives an aircraft command from a command sensor 120 attached to an aircraft control 112. Aircraft component 116 includes any of the aircraft component 116 as described above, in reference to FIGS. 1-8. Aircraft command includes any of the aircraft command as described above, in reference to FIGS. 1-8. Command sensor 120 includes any of the command sensor 120 as described above, in reference to FIGS. 1-8. Aircraft control 112 includes any of the aircraft control 112 as described above, in reference to FIGS. 1-8.

Still referring to FIG. 9, at step 910, aircraft component 116 obtains an aircraft orientation from an attitude sensor 124. Aircraft orientation includes any of the aircraft orientation as described above, in reference to FIGS. 1-8. Attitude sensor 124 includes any of the attitude sensor 124 as described above, in reference to FIGS. 1-8.

Still referring to FIG. 9, at step 925, aircraft component 116 receives a pilot signal 432 as a function of a notification unit 804. Pilot signal 432 includes any of the pilot signal 432 as described above, in reference to FIGS. 1-8. Notification unit 804 includes any of the notification unit 804 as described above, in reference to FIGS. 1-8.

Still referring to FIG. 9, at step 920, aircraft component 116 commands a plurality of flight components 108 to produce a response command. Plurality of flight components 108 includes any of the plurality of flight components 108 as described above, in reference to FIGS. 1-8. Response command includes any of the response command as described above, in reference to FIGS. 1-8.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
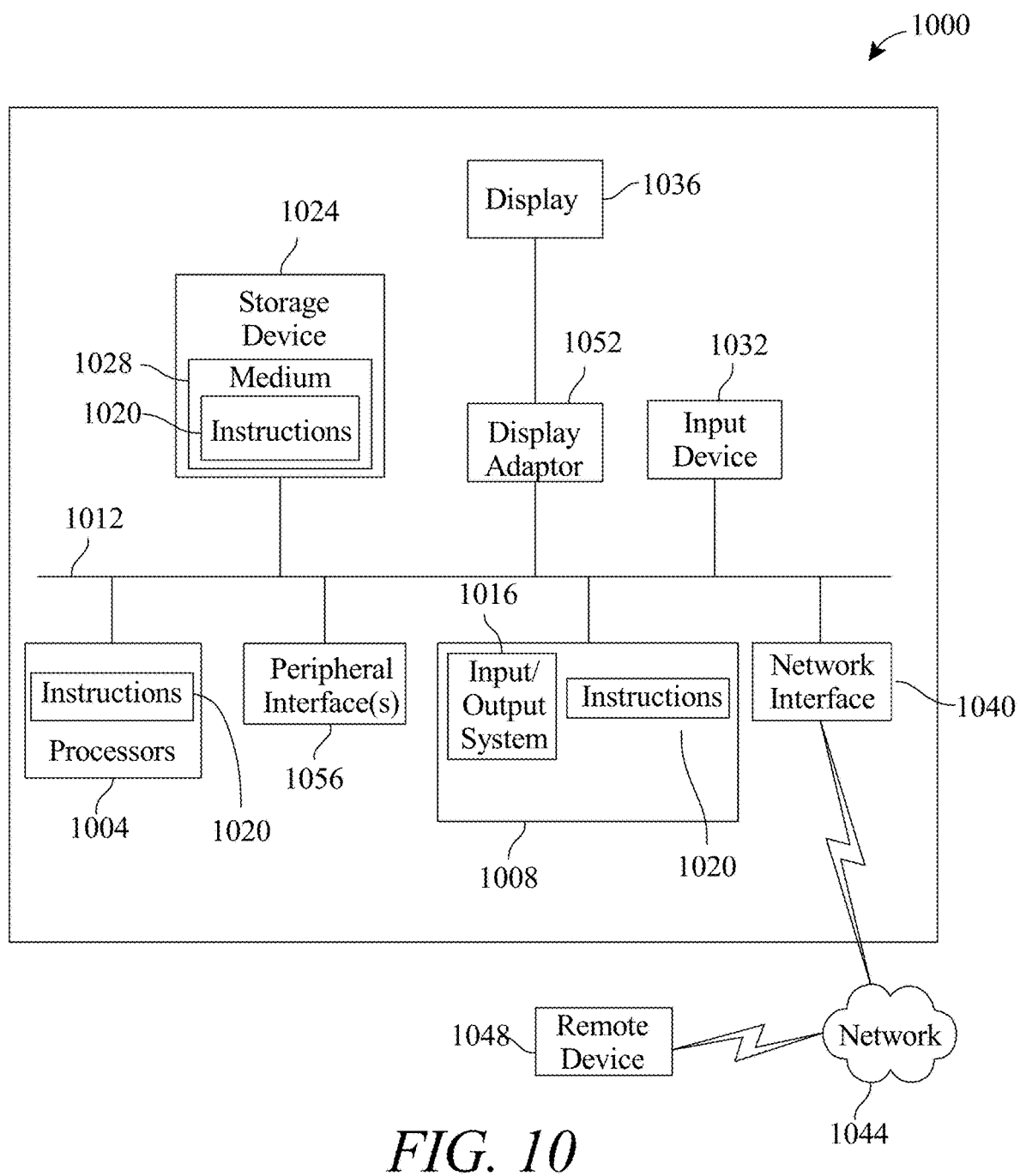
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIRE-WIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for distributed pilot control of an aircraft, the system comprising:
 a plurality of flight components;
 an aircraft control located within the aircraft; and
 an aircraft component attached to a flight component of the plurality of flight components, wherein the aircraft component is configured to:
  receive, from a command sensor attached to the aircraft control, an aircraft command;
  obtain, from an attitude sensor, an aircraft orientation; and
  receive, as a function of a notification unit, a pilot signal; and
  command the flight component to produce a response command as a function of the pilot signal, wherein producing the response command further comprises:
   determining at least an aircraft response, wherein determining at least an aircraft response further comprises:
    simulating an aircraft command adjustment as a function of a control algorithm; and
    determining the aircraft response using the aircraft command adjustment; and
   producing the response command as a function of the aircraft response.

2. The system of claim 1, wherein the aircraft component is further configured to:
 receive an alternate signal from an alternate aircraft component; and
 command the flight component as a function of the alternate signal.

3. The system of claim 1, wherein the aircraft control is configured to translate a desired command.

4. The system of claim 3, wherein the desired command includes a desired torque for the flight component of the plurality of flight components.

5. The system of claim 1, wherein the plurality of flight components includes a propulsor.

6. The system of claim 5, wherein the propulsor includes a puller component.

7. The system of claim 5, wherein the propulsor includes a pusher component.

8. The system of claim 1, wherein the command sensor is configured to:
 detect an aircraft command, wherein the aircraft command includes a desired output of the flight component of the plurality of flight components; and
 transmit the aircraft command to the aircraft component.

9. The system of claim 8, wherein transmitting the aircraft command further comprises converting the aircraft command to a digital electrical signal.

10. The system of claim 1, wherein the attitude sensor is configured to:
   detect an aircraft orientation, wherein the aircraft orientation includes an aircraft attitude; and
   transmit the aircraft orientation to the aircraft component.

11. The system of claim 1, wherein the aircraft component includes a microprocessor.

12. The system of claim 1, wherein the response command includes an actuator command.

13. The system of claim 1, wherein the response command includes a thrust command.

14. The system of claim 1, wherein the control algorithm is configured to:
   receive a segmented control algorithm;
   determine a segmentation boundary as a function of the segmented control algorithm; and
   create an optimized signal communication as a function of the segmentation boundary.

15. The system of claim 14, wherein creating the optimized signal communication further comprises separating a plurality of signal codes across a communication network.

16. The system of claim 15, wherein the communication network includes a master bus controller configured to synchronize timing of the plurality of signal codes.

17. The system of claim 1, wherein simulating the aircraft command adjustment further comprises detecting a failure event and simulating the aircraft command adjustment as a function of the failure event.

18. The system of claim 1, wherein determining the at least an aircraft response further comprises:
   receiving, from the command sensor attached to the aircraft control, a first aircraft command;
   obtaining, from a related flight component of the plurality of flight components, an adjustment impact; and
   determining the at least an aircraft response as a function of the first aircraft command and the adjustment impact.

* * * * *